(12) United States Patent
Vis

(10) Patent No.: US 10,007,474 B2
(45) Date of Patent: Jun. 26, 2018

(54) METHOD AND DEVICE FOR PROCESSING CONTENT FOR DISPLAY

(71) Applicant: Jasper Vis, Utrecht (NL)

(72) Inventor: Jasper Vis, Utrecht (NL)

( * ) Notice: Subject to any disclaimer, the term of this patent is extended or adjusted under 35 U.S.C. 154(b) by 151 days.

(21) Appl. No.: 14/143,479

(22) Filed: Dec. 30, 2013

(65) Prior Publication Data

US 2015/0153993 A1    Jun. 4, 2015

(30) Foreign Application Priority Data

Nov. 29, 2013  (NL) ..................... 2011867

(51) Int. Cl.
| | |
|---|---|
| *G09G 5/00* | (2006.01) |
| *G06F 3/14* | (2006.01) |
| *G06T 1/20* | (2006.01) |
| *G06F 3/0488* | (2013.01) |
| *G06F 1/16* | (2006.01) |
| *H04M 1/725* | (2006.01) |

(52) U.S. Cl.
CPC .......... *G06F 3/1446* (2013.01); *G06F 1/1643* (2013.01); *G06F 1/1647* (2013.01); *G06F 3/0488* (2013.01); *G06F 3/04886* (2013.01); *G06T 1/20* (2013.01); *G06F 3/04883* (2013.01); *G06F 2203/04808* (2013.01); *G09G 2340/0407* (2013.01); *G09G 2340/0464* (2013.01); *G09G 2356/00* (2013.01); *H04M 1/7253* (2013.01); *H04M 2250/16* (2013.01)

(58) Field of Classification Search
CPC .... G06F 3/1446; G06F 1/1643; G06F 1/1647; G06F 3/04886; G06F 3/0488; G06F 3/04883; G06F 2203/04808; G06T 1/20; G09G 2356/00; G09G 2340/0407; G09G 2340/0464; H04M 1/7253; H04M 2250/16
USPC ........................................ 345/1.3, 156–178
See application file for complete search history.

(56) References Cited

U.S. PATENT DOCUMENTS

| | | |
|---|---|---|
| 2010/0053164 A1 | 3/2010 | Imai et al. |
| 2012/0062475 A1 | 3/2012 | Locker et al. |
| 2012/0206319 A1 | 8/2012 | Lucero et al. |

(Continued)

OTHER PUBLICATIONS

Search Report & Written Opinion of Application No. NL 2011867 dated Aug. 4, 2014.

*Primary Examiner* — Amit Chatly
(74) *Attorney, Agent, or Firm* — Fishman Stewart PLLC

(57) ABSTRACT

The methods enable display of a data object over two display apparatuses on the fly by operatively connecting two independent content processing devices together. Each device is arranged for rendering a subset of a dataset representing a data object When shown by display devices fed by each content processing devices, display of the subsets result in display of at least part of the data object in a contiguous way over the joint display area provided by the display devices. Furthermore, it enables interactive control of the way the data object is displayed over a display area provided by the first display apparatus controlled by the first content processing device and the second display apparatus controlled by the second content processing device. The method may be extended to more than two screens. The devices may operate in a master-slave configuration or in a peer-to-peer configuration, with or without a central server.

18 Claims, 6 Drawing Sheets

(56) References Cited

U.S. PATENT DOCUMENTS

| | | | |
|---|---|---|---|
| 2012/0242893 A1* | 9/2012 | Akitomo | G06F 3/1446 |
| | | | 348/441 |
| 2013/0027321 A1* | 1/2013 | Chen | G06F 3/04883 |
| | | | 345/173 |
| 2013/0038509 A1 | 2/2013 | Jiang | |
| 2013/0222405 A1* | 8/2013 | Ademar | G06F 3/1423 |
| | | | 345/581 |

* cited by examiner

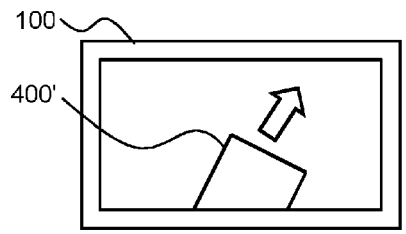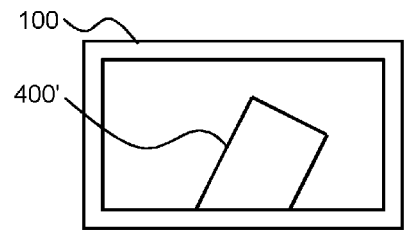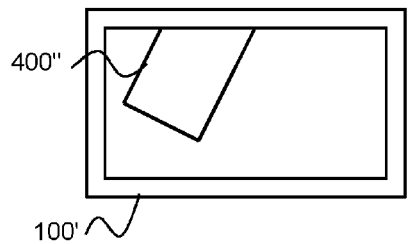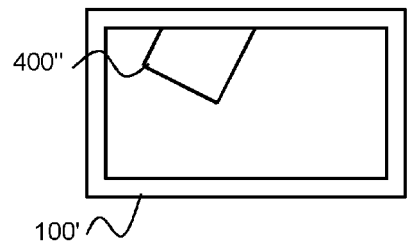
Fig. 4 A                Fig. 4 B
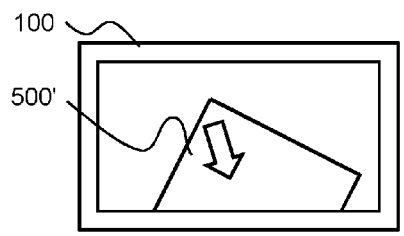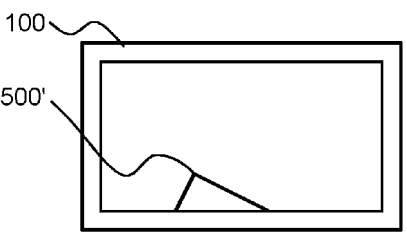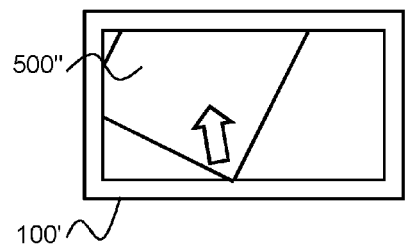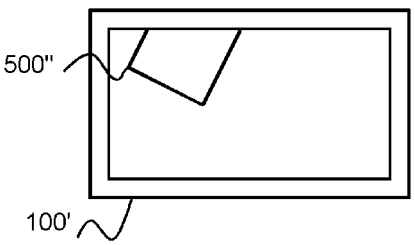
Fig. 5 A                Fig. 5 B

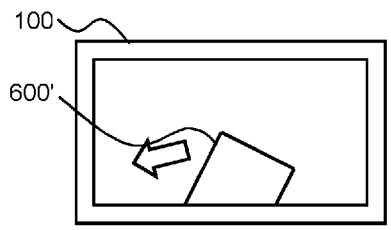 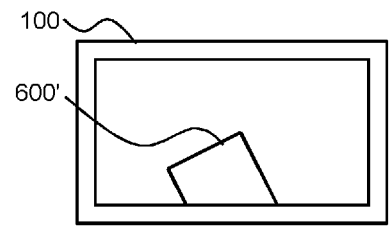
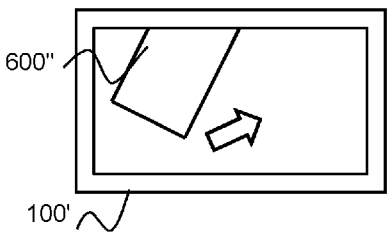 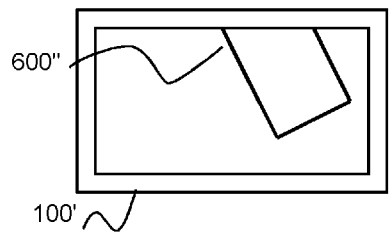
Fig. 6 A                    Fig. 6 B
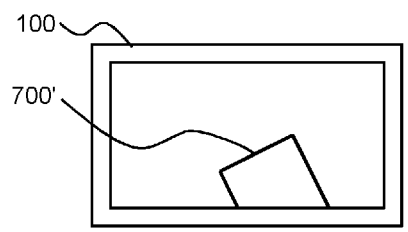
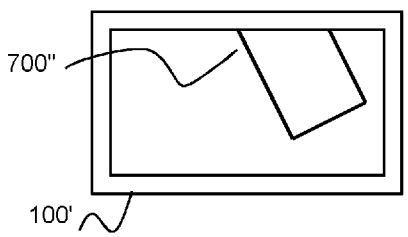
Fig. 7

METHOD AND DEVICE FOR PROCESSING CONTENT FOR DISPLAY

This application claims priority to Netherlands patent application no. 2011867, filed Nov. 29, 2013, the content of which is incorporated herein by reference in its entirety.

BACKGROUND

Video walls comprising multiple screens, together showing a single picture or film are known for a longer time. The screens are controlled by a processing unit, splitting up the analogue television signal in—for example—PAL format into multiple signals to be displayed by the various screens.

SUMMARY

The advent of touch screens and in particular computers comprising a touch screen, like tablet computers enables new opportunities for displaying data objects by multiple display devices. It is preferred to control the way data objects are displayed by two or more display devices together, where the display devices provide partial screens for displaying the data object.

A first aspect provides, in a first content processing device for processing content for display by a first display apparatus, a method of processing at least a part of a content item. The method comprises obtaining at least a first subset of a dataset representing a content item and rendering data comprised by the first subset for display by the first display apparatus. The method further comprises receiving a user input command for changing display of at least part of the content item by the first display apparatus, determining a second subset of the dataset, the second subset comprising data to be rendered for display by the first display apparatus in accordance with the user input command and rendering data comprised by the second subset for display by the first display apparatus. Data enabling the second content processing device to render a third subset of the dataset for display by the second display apparatus is communicated to a second content processing device.

The communicated data enables the second processing device to render the data in the third subset such that display by the second display apparatus of the rendered data of the third subset results in displaying at least part of the content item by the first display apparatus and the second display apparatus in a substantially contiguous way in accordance with the user input command.

This method enables display of a data object over two display apparatuses on the fly by joining two independent devices together. Furthermore, it enables interactive control of the way the data object is displayed over a display area provided by the first display apparatus controlled by the first content processing device and the second display apparatus controlled by the second content processing device.

An embodiment of the first aspect comprises obtaining position data indicating a first position of the first display apparatus relative to a second position of the second display apparatus and wherein communicating data enabling the second content processing device to render a third subset of the dataset for display by the second display apparatus comprises communicating the position data.

This embodiment enables the second content processing device to determine the third subset itself. This reduces the processing need in the first content processing device, which in turn enhances battery lifetime. The third subset is determined based on how the second content processing device is located relative to the first content processing device. Communication of this data enables the second content processing device how to determine the third subset to show the data object as a contiguous data object.

Another embodiment of the first aspect comprises obtaining position data indicating a first position of the first display apparatus relative to a second position of the second display apparatus; and based on the position data, determining the third subset. Communicating data enabling the second content processing device to render a third subset of the dataset for display by the second display apparatus comprises communicating the third subset.

In this embodiment, a majority of the processing is handled by a master device, the first content processing device. This embodiment may have as an advantage that only one device with a powerful processor may be required as a master and that the second content processing device may have a lighter processing unit.

In a further embodiment of the first aspect, communicating data enabling the second content processing device to render a third subset of the dataset for display by the second display apparatus comprises communicating data on the second subset.

Also in this embodiment, processing of data is distributed over the first content processing device and the second content processing device. The data on the second subset may comprise data on what part of the data object is rendered for display by the first display apparatus, data on a position on a screen where data in the first subset is played. Communication of this data may enable the second content processing device to determine the third subset such that when data in the third subset is rendered and displays, displays the data object as a contiguous object together with rendered and displayed data of the first subset.

A second aspect provides, in a second content processing device for processing content for display by a second display apparatus, a method of processing at least part of a content item. The method comprises receiving, from a first content processing device for processing content for display by a first display apparatus provided in the vicinity of the second display apparatus, data enabling the second content processing device to render a third subset of the dataset for display by the second display apparatus, the data received enabling the second content processing device to obtain the data in the third subset such that display by the second display apparatus of the rendered data of the third subset results in displaying at least part of the content item in a substantially contiguous way over the first display apparatus and the second display apparatus. The method further comprises obtaining the third subset based on the data received; and rendering data comprised by the third subset for display by the second display apparatus.

This device is enabled to cooperate with the device according to the first aspect.

In an embodiment of the second aspect, the data received from the first content processing device comprises data related to a first subset of the dataset, the first subset comprising data rendered by the first content processing device for display by the first display apparatus. The method further comprises obtaining the dataset; obtaining position data of a position of the first display apparatus relative to the second display apparatus; and based on the position data and the data related to the first subset, determining the third subset.

In this embodiment, the burden of processing data may be distributed over the first content processing device and the second content processing device.

A third aspect provides an arrangement for processing content for display by a first display apparatus, the device comprising:
A rendering module for rendering data for displaying the data by the first display apparatus, the rendering module being arranged to obtain at least a first subset of a dataset representing a content item and to render data comprised by the first subset for display by the first display apparatus;
A user input module for receiving a user input command for changing display of at least part of the content item by the first display apparatus;
A processing unit arranged to determine a second subset of the dataset, the second subset comprising data to be rendered for display by the first display apparatus in accordance with the user input command; and
A communication module arranged to communicate, to a second content processing device, data enabling the second content processing device to render a third subset of the dataset for display by the second display apparatus, the communicated data enabling the second processing device to render the data in the third subset such that display by the second display apparatus of the rendered data of the third subset results in displaying at least part of the content item by the first display apparatus and the second display apparatus in a substantially contiguous way in accordance with the user input command;
Wherein the rendering module is arranged to render data comprised by the second subset for display of the data of the second subset by the first display apparatus.

A fourth aspect provides an arrangement for processing content for display by a second display apparatus, the device comprising:
A communication module arranged to receive, from a first content processing device for processing content for display by a first display apparatus provided in the vicinity of the second display apparatus, data enabling the second content processing device to render a third subset of the dataset for display by the second display apparatus, the data received enabling the second content processing device to render the data in the third subset such that display by the second display apparatus of the rendered data of the third subset results in displaying at least part of the content item in a substantially contiguous way over the first display apparatus and the second display apparatus; and
A rendering module for rendering data for displaying the data by the second display apparatus, the rendering module being arranged to obtain at least a second subset of a dataset representing a content item and to render data comprised by the second subset for display by the second display apparatus.

A fifth aspect provides a computer programme product comprising code causing a processing unit, when the code is loaded into the processing unit, is arranged to carry out the method according to the first aspect.

A sixth aspect provides a computer product comprising code causing a processing unit, when the code is loaded into the processing unit, is arranged to carry out the method according to the second aspect.

BRIEF DESCRIPTION OF THE FIGURES

The various aspects and embodiments thereof will now be discussed in further detail in conjunction with Figures. In the Figures:

FIG. 4 A shows the first tablet computer and the second tablet computer with an indication of a first user input;
FIG. 4 B shows the first tablet computer and the second tablet computer showing a data object following the first user input;
FIG. 5 A shows the first tablet computer and the second tablet computer with an indication of a second user input;
FIG. 5 B shows the first tablet computer and the second tablet computer showing a data object following the second user input;
FIG. 6 A shows the first tablet computer and the second tablet computer with an indication of a third user input;
FIG. 6 B shows the first tablet computer and the second tablet computer showing a data object following the third user input;
FIG. 7 shows the first tablet computer and the second tablet computer showing a data object together in a specific way.

DETAILED DESCRIPTION

Figure 1:
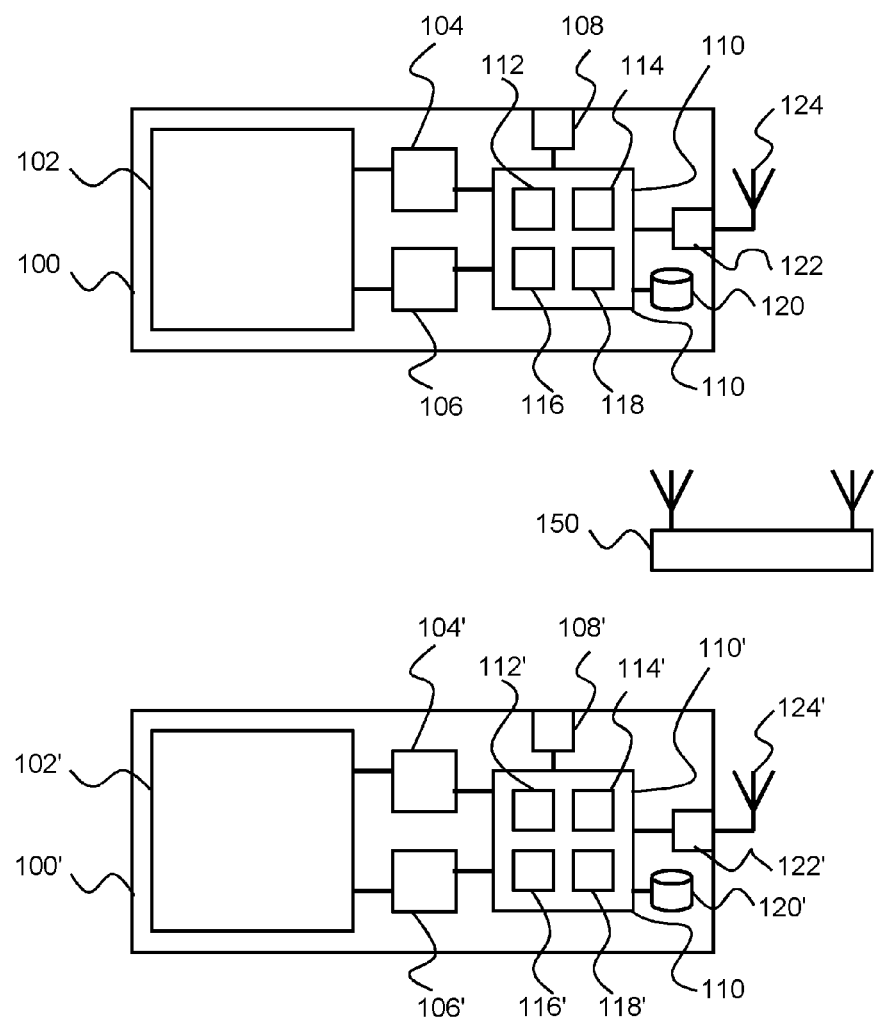
FIG. 1 shows a first tablet computer, a second tablet computer and a router.

FIG. 1 shows a first tablet computer 100 as a device for processing content for display on a screen. FIG. 1 also shows a second tablet computer 100' as a device for processing content for display on a screen. The first tablet computer 100 and the second tablet computer 100' comprise equivalent parts. Therefore, only the components of the first tablet computer 100 will be discussed in further detail.

The first tablet computer 100 comprises a first touch screen 102 as a display, a rendering module 104 for rendering content for display on the first touch screen 102, a user input module 106 for receiving input from the touch screen 102, a microprocessor 110 as a processing unit, a device detection unit 108, a communication unit 122, a memory module 120 and an antenna 124. Although the antenna 124 drawn outside the tablet computer 100, it may also be comprised within the perimeter of a casing of the first tablet computer 100.

The microprocessor 110 comprises a set determination sub-unit 112, memory sub-unit 114, a position data analysis sub-unit 116 and an image data processing sub-unit 118. The sub-units of the microprocessor 110 are preferably arranged to perform their functions by means of computer executable code. The computer executable code is preferably stored in the memory module 120. Alternatively, the circuits in the microprocessor 110 are hardwired as the sub-units named above. In yet another alternative, the code is stored in the memory sub-unit 114.

The first tablet computer 100 and the second tablet computer 100' are arranged for performing methods of displaying one or more content objects on their screens. By means of these methods, a content object may be shown across the screens of the first tablet computer 100 and the second tablet computer 100'.

The first tablet computer 100 and the second tablet computer 100' are arranged to communicate with one another via a wireless router 150. The communication may be arranged by means of an IEEE 802.11 protocol, a cellular communication protocol like HSDPA or LET, another wireless or wired network protocol or a combination thereof. In another alternative, the first tablet computer 100 and the second tablet computer 100' communicate with one another via a wired network or via a direct link.

Figure 2:
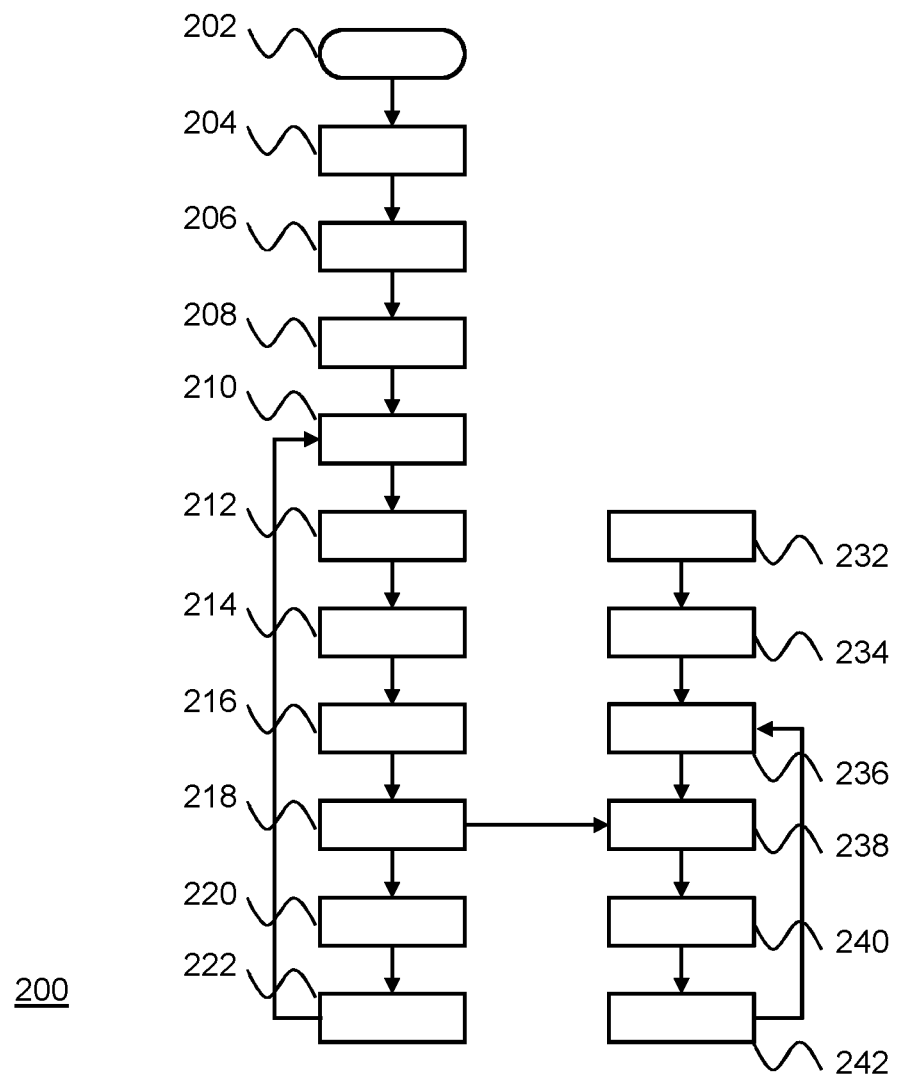
FIG. 2 shows a first flowchart.

FIG. 2 shows a first flowchart 200 depicting a method for rendering content for display on the first screen 102 of the first tablet computer 100 and the second screen 102' of the second tablet computer 100'. The list below provides a short description of each part of the first flowchart 200. The first flowchart 200 will described in further detail after the list.

202 Start process
204 Receive position data on positions of the first and second screen relative to one another
206 Connect to second device
208 Receive data object to be displayed
210 Determine first set for part of object to be displayed on first screen
212 Determine second set for part of object to be displayed on second screen
214 Render data in first set for display;
216 Display rendered data of first set;
218 Send second set to second device;
220 Receive user input for changing display of object;
222 Calculate new image data for displaying object;
232 Initialise second device
234 Report second device to first device
236 Wait for data
238 Receive data from second device
240 Render second set;
242 Display rendered data of second set The process starts in a terminator 202. The start may be the first tablet computer 100 loading computer executable code in the first microprocessor 110 enabling the first tablet computer to execute the method discussed below.

The process continues with step 204 by receiving position data on positions of the first tablet computer 100 and the second tablet computer 100' relative to one another. The position data may be obtained by means of a user interface provided on the first screen 102 of the first tablet computer 100. In the user interface, a user may indicate positions of the tablet computers 100 relative to one another. In one embodiment, the user is able to indicate whether the first tablet computer 100 is provided above, below, left or right from the second tablet computer 100'- or vice versa. Additionally, further information may be provided by the user, like actual distances between the first tablet computer 100 and the second tablet computer 100'. Furthermore, a more advanced user interface may be provided in which the user is able to indicate an offset from a directly horizontal or vertical position or a tilt of one of the tablet computers relative to another.

Alternatively or additionally, position data may be acquired by means of the device detection unit 108. The device detection unit 108 may comprise an infrared communication port, an NFC communication port, a tilt sensor, other, or a combination thereof. By means of the device detection unit 108 of the first tablet computer 100 as well as the second tablet 100', the first tablet computer 100 and the second tablet computer 100' can determine their positions relative to the other tablet computer by means of the position data analysis sub-unit 116. With this information obtained by each of the tablet computers, each tablet computer can operate more autonomously compared to an embodiment where position data is provided manually to for example only the first tablet computer 100.

For the process depicted by the first flowchart 200, position data may be provided manually to the first tablet computer 100. A user is to provide information to the first tablet computer whether the first tablet computer 100 and the second tablet computer 100' are provided above one another or next to one another and which of the two tablet computer is provided on the right or left or on top or bottom. After determination of position data, the first tablet computer 100 connects to the second tablet computer 100' via the router 150 in step 206. Alternatively, both tablet computers connects at an earlier stage, when both have specific application data loaded in their microprocessors. Such application data may, when executed, cause the microprocessors to have the tablet computers search for one another over a network established by means of the router 150.

The second tablet computer 100' firstly initialises in step 232, for example by running through a boot sequence and subsequently loading computer executable instructions enabling the second microprocessor 110' to carry out the method discussed below. In step 234, the second tablet computer 100' reports to the first tablet computer 100 upon receiving a connection request the first tablet computer 100 has sent out in step 206. After connecting and reporting, the second tablet computer 100' enters a waiting state in step 236 in which the second tablet computer 100' wait for data to be received.

Step 204 and step 206 may also be executed in a different order. In one embodiment, the devices firstly discover one another via the router 150, which may run a DHCP service from which presence of multiple devices may be discovered. Alternatively, information and services may be employed on other layers, for example via the UDP protocol on the transport layer.

The further devices may be discovered using a so-called device radar. The device radar is a sub-process that may run on the first tablet computer 100 that looks for devices running processes that are responsive to the radar sub-process. This enables the first tablet to discover devices arranged for participating in the process depicted by FIG. 2. The discovered devices, for example the second tablet 100', may be discovered by the first tablet computer 100 upon which both tablet computers may connect. Subsequently, the user may indicate, for example in a grid comprising multiple location entries, where the first tablet computer 100 and the second tablet computer 100' are positioned relative to one another.

If the first tablet computer 100 and the second tablet computer 100' are not members of a LAN controlled by the router 150 as—for example—a 802.11 router, but are connected to a wide area network like the internet, discovery may be done in another way. Such scenario may exist if the tablet computers are directly connected to a cellular subscription network like HSDPA, LTE, WCDMA, another network or a combination thereof. If the tablet computers are connected to the internet, they are identifiable by means of an IP address.

The devices may be connected to one another by providing at least a first of the two with the IP address of a second of the two tablet computers. Alternatively, both tablet computers are provided with IP addresses of other participating tablet computers. The addresses may be provided manually or by semi-automatic processes. In one embodiment, the tablet computers comprise an NFC communication module by means of which IP addresses may be communicated automatically or following a user command upon the tablet computers having been brought in one another's close vicinity. Also other information may be exchanged in this way or devices may be connected in this, for example by means of Bluetooth pairing.

The first tablet computer 100 receives the data object to be displayed on the screens 102 of the tablet computers 100 in step 208. The data object may already be stored in the memory module 120 of the first tablet computer 100. Alternatively, the data object is received by means of the communication module 122 from another source. The data object is provided as a set of data, preferably in a file. The data object may be a film, an image like a photograph or an executable file like a game. In the latter case, execution of code provided in the file results in a visual and optionally audio output where the visual output data may be manipulated based on user input. The execution of the code enabling the game may be provided by the first processing unit 110, the second processing unit 110', or both.

In step 210, a first subset of the dataset of the data object is determined by the set determination sub-unit 112. The first subset comprises data to be displayed on the first screen 102 of the first tablet computer 100. Referring to FIG. 4 A, showing the first tablet computer 100 and the second tablet computer 100', the first subset comprises data for displaying a first object part 400' of a data object 400 on the first screen 102. The first subset may be determined based on user preference data stored in the first tablet computer 100, like a preferred initial size of the data object 400, user, preference data directly provided in a file of the data object 400, other, or a combination thereof. Processing of this information is handled by the image data processing sub-unit 118.

Subsequently, in step 212, a second subset is determined by the set determination sub-unit 112 of the first tablet computer 100. The second subset comprises data for display on the second screen 102' of the second tablet computer 100'. FIG. 4 A shows the first tablet computer 100 and the second tablet computer 100' placed in vicinity of one another. Vicinity is in this context to be understood such that when the first screen 102 displays a first object part 400' of a data object 400 and the second screen 102' displays a second object part 400" of the data object 400, the first object part 400' and the second object part 400" are perceived as forming parts of the continuous data object 400. In one embodiment with relatively small ten inch (25 centimeters) screens (diagonal), vicinity may mean a distance between 0 and 10 centimeters. With screen as large as 50 inch (125 centimeters), vicinity may mean a distance between 10 centimeters and as much as two meters. It is not so much the actual distance that matters, but the perception of the user.

Referring to FIG. 4 A, showing the first tablet computer 100 and the second tablet computer 100', the second subset comprises data for displaying a second object part 400" of a data object 400 on the second screen 102'. The second subset may be determined based on the positions of the first tablet computer 100 and the second tablet computer 100' relative to one another, the orientation and position of the data object as to be displayed on the first screen 102, other, or a combination thereof. The second subset may comprise data indicating exactly where the data comprised by the second subset is exactly to be displayed on the second screen 102'. This position may be calculated by the set determination sub-unit 112 of the first tablet computer 100.

In step 214, data of the first subset is rendered by the first rendering module 104 and subsequently provided to the first touch screen 102. The term rendering may comprise, without limitation, decompression, decryption, conversion of vector data to pixel data, other, or a combination thereof, to convert data comprised by the first subset to data that may be displayed by the first screen 102. Although the rendering module 104 is drawn separately from the microprocessor 110, the function of rendering may also be performed by the microprocessor 110. The data thus rendered is provided to the first screen 102 for display and displayed in step 216.

In step 218, data of the second subset is sent to the second tablet computer 100'. Upon receiving the data of the second subset, the second tablet computer 100' leaves the waiting state of step 236 and proceeds to step 238 in which the second tablet computer 100' receives data of the second subset. In the second tablet computer 100', the data of the second subset is received by means of the second communication module 122' and subsequently transmitted to the second microprocessor 110'. The second microprocessor 110' forwards the data of the second subset to the second rendering module 104'. The second rendering module 104' renders the data of the second subset and provides the rendered data, ready for display, to the second touch screen 102' in step 240. The second touch screen 102' displays the data of the second subset in step 242. Referring to FIG. 4 A again, the second object part 400" of a data object 400 is displayed on the second screen 102'. After the second object part 400" has been displayed, the second tablet computer 100' returns to step 236, waiting for further data to be received, rendered and displayed.

The first tablet computer 100, having sent data of the second subset to the second tablet computer 100', enters a waiting state, waiting for a user input in step 220. Such user input is preferably a gesture of the user on the touch screen 102 of the first tablet computer with one or more fingers or other objects, like swiping, pinching, other or a combination thereof. Additionally or alternatively, user input may be acquired from the second touch screen 102' of the second tablet computer 100'. The user input may be a command for resizing, re-orienting or moving the data object 400 on the first touch screen 102 and the second touch screen 102'- or another command. Referring to FIG. 4 A, the user command may be provided to move the data object displayed in the direction of the arrow. This is preferably done by the user putting his or her finger down on the first touch screen 102' and swiping the finger in the direction of the arrow.

In FIG. 4 A and FIG. 4 B, screens of equal sizes are shown. This results in the first object part 400' having substantially the same size as the second object part 400" when the data object is moved from the first tablet computer 100 to the second tablet computer 100'. Alternatively, cooperating screens may have different sizes. In such scenario, the data object 400 may be shown in different sizes on different screens. In one embodiment, the relative size of the data object on the screen in preserved. This results in the data object 400 being shown larger on the larger screen. In another embodiment, the absolute size of the data object 400 is preserved. In yet another embodiment, the data object is shown on both screens having the same amount of pixels. In the latte embodiment, the actual size of the data objects and parts thereof shown on the screens depends on the display resolution set for each screen.

FIG. 4 B shows the intended location of displaying the data object 400 on the first touch screen 102 and the second touch screen 102'. Having received the user input, the first tablet computer recalculates image data for displaying the data object 400. The total image to be displayed may be the same, in case the user input received relates to a mere movement of the location where the data object 400 is shown over the two tablet computers. Alternatively or additionally, the user input may relate to resizing or tilting of the display of the data object 400 on the screen. In particular in such cases, data to be displayed may have to be recalculated.

After the image data for display of the data object 400 has been recalculated, the process returns to step 210 in which the data for the first subset is recalculated. After step 210, the process continues to step 212 as discussed above.

In the process as discussed above, the first tablet 100 acts as master and the second tablet computer 100' acts as a slave device. These roles may be switched during operation. User input may also be received by means of the second touch screen 102' of the second tablet computer 100'. The user input thus received may be sent to the first tablet computer 100 for determining the subsets for each touch screen to display. Alternatively, the second tablet computer 100' obtains the dataset representing the full data object to be displayed, the position data related to the relevant tablet computers and determines the subsets for each touch screen to display.

Switching of roles may mean that waiting state 220 and waiting state 236 are interchangeable or may be one and the same state in which both tablet computers stay in a period over which no processing takes place and/or no user input is received. The tablet computer receiving a user command proceeds via the left chain of the first flowchart 200 depicted by FIG. 2, the other tablet computer or tablet computers proceed via the right chain of the first flowchart 200. In yet another embodiment, the determination of the first subset, the second subset and possibly further subsets is done by one and the same tablet computer designated as server, irrespective from whether this server tablet computer receives user input or not. The server may be determined statically at the start of the process. Alternatively, the role of server may rotate between various tablet computers. The server may be pre-determined or determined dynamically based on battery reserve, actual processor load, actual processor power, reception of user commands, storage space, other, or a combination thereof.

A user command may also be received by means of two tablet computers. This scenario is depicted by FIG. 5 A and FIG. 5 B. In this scenario, the user makes a gesture with two fingers, over the first touch screen 102 of the first tablet computer 100 and the second touch screen 102' of the second tablet computer, in the directions of the arrows. The user input command received by the second touch screen 102' may be sent to the first tablet computer 100 for determining total image data of the data object. As the gesture indicated in FIG. 5 A typically relates to resizing of an object, making the object smaller, a smaller display of the data object is determined, by the image data processing sub-unit 118. Subsequently a first subset for displaying a first object part 500' and a second subset for displaying a second object part 500" are calculated by the first tablet computer 100. Having determined the second subset, the data of the second subset is communicated to the second tablet computer 100' for display on the second touch screen 102'. Alternatively, the computing is performed by the second tablet computer 100'.

Figure 3:
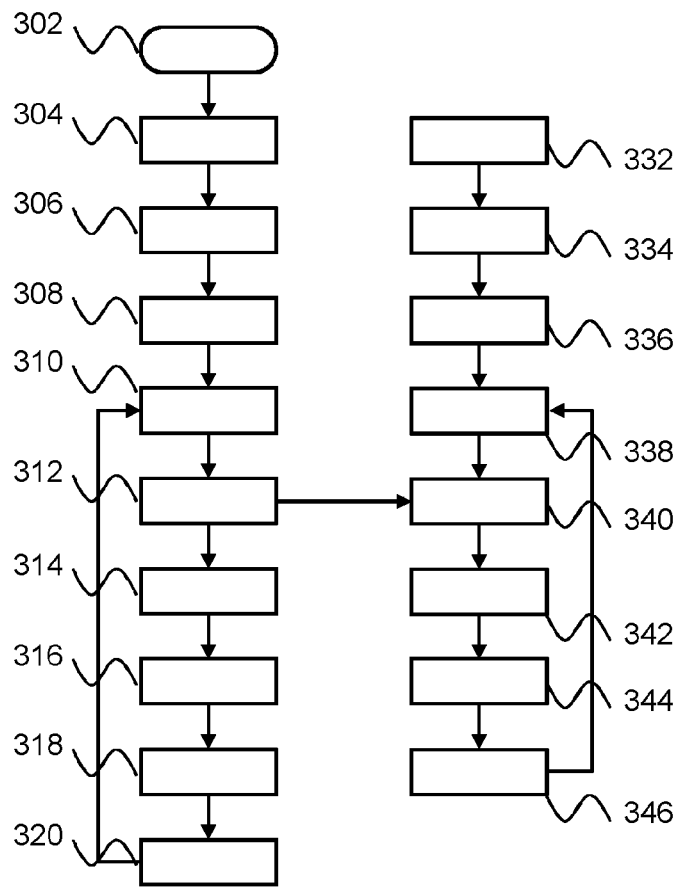
FIG. 3 shows a second flowchart.

In the embodiments discussed above, at least most of the processing of user input data, position data and image data is performed centrally on either one of the tablet computers. Alternatively, processing of object data may be performed in a more distributed way. FIG. 3 shows a second flowchart 300 depicting a process where data is processed in a more distributed way. The list below provides short summaries of the parts of the second flowchart 300.

302 Start process
304 Receive position data
306 Connect to second device
308 Receive data object to be displayed
310 Determine first subset
312 Send data to the second device
314 Render data in first set for display
316 Display rendered data of first set
318 Receive user input for changing display of object
320 Calculate new image data for displaying object
332 Initialise second device
334 Receive position data
336 Connect to first device
338 Wait for data
340 Receive data from second device
342 Determine second set for part of object to be displayed on second screen
344 Render second set;
346 Display rendered data of second set The process depicted by the second flowchart starts with the first tablet computer 100 in a terminator 302. The start may be the first tablet computer 100 loading computer executable code in the first microprocessor 110 enabling the first tablet computer to execute the method discussed below. Subsequently, position data is received on a first position of the first tablet computer 100 relative to the second tablet computer 100'. The position data may be obtained in the same way or a similar way as discussed above in conjunction with the first flowchart 200.

In parallel, the second tablet computer initialises in the same or a similar way in step 332 and receives position data in step 334 in any of the ways discussed above. Thus, the position data may be received via the first tablet computer 100 following user input or detection of the second tablet computer 100'. Alternatively, the second tablet computer 100 may collect position data for the relative positions of the first tablet computer 100 and the second tablet computer 100' autonomously.

Subsequently, the first tablet computer 100 connects to the second tablet computer 100' in step 306 and the second tablet computer 100' connects to the first tablet computer 100 in step 336 in the same way or a similar way as discussed above in conjunction with the first flowchart 200. By connecting, the first tablet computer 100 and the second tablet computer 100' are aware of one another's presence and ability to jointly display a data object on their screens. Subsequently the second tablet computer enters a waiting state in step 338.

In step 308, a dataset representing a data object to be displayed is received by the first tablet computer 100. Subsequently, in step 310, a first subset of data to be displayed on the first touch screen 102 is determined. This is preferably done by the set determination sub-unit 112. Having determined the first sub-set, data is sent to the second tablet computer 100'. Data sent to the second tablet computer 100' is sent to enable the second tablet computer 100' in step 312. The data sent to the second tablet computer 100' is provided for the second tablet computer 100' to determine a second subset of data to determine a second subset of the dataset in order to be able to display an appropriate part of the data object on the second touch screen 102'. Such data may include, but is not limited to, the first subset and how the data of the first subset is displayed on the first touch screen 102, the dataset representing the data object, position data, other, or a combination thereof.

The receiving of the data by the second tablet computer 100' and the processing of the received data will be discussed further below.

Having sent data to the second tablet computer 100', the first table computer 100 renders the data of the first subset by means of the first rendering module 104 in step 314. The rendered data is displayed on the first touch screen 102 in step 316. In step 318, the process enters a waiting state, waiting for a user input to be received via the touch screen 102. The user input may be received by the first tablet computer 100, the second tablet computer 100' or both. The user input is processed by the user input module 106 and relayed to the microprocessor 110. The microprocessor 110 and the image data processing sub-unit in particular determine how the data object is to be displayed by the multiple touch screens as a whole, following the user input command received in step 320. Alternatively or additionally, the user input may be processed by the microprocessor 110' of the second tablet computer 100'.

Having determined and calculated in particular how the data object is to be displayed over the ensemble of the touch screen 102 of the first tablet computer 100 and the touch screen 102' of the second tablet computer 100', the process jumps back to step 310. From step 310 onward, the flowchart 300 is followed again as described above.

The second tablet computer 100' receives the data sent by the first tablet computer 100 in step 410. The received data is processed by the set determination sub-unit 112' of the microprocessor 110' of the second tablet computer 100' to determine a second subset of the dataset representing the data object to be displayed. With the position data, that may be received from the first tablet computer 100 or determined autonomously by the second tablet computer 100', the dataset representing the data object and data on the first subset and how this is displayed on the touch screen 102 of the first tablet computer, the second tablet computer 100' and the set determination sub-unit 112' in particular can determine the second subset. The second subset is determined in step 342.

The data of the second subset thus determined is provided to the rendering module 104' of the second tablet computer 100' in step 344 for rendering the data of the second subset for being displayed on the touch screen 102'. The data thus rendered is displayed on the touch screen 102' of the second tablet computer in step 346. Subsequently, the process jumps back to the waiting state in step 338 until new data is received. It is noted the waiting state may also be a waiting state of step 310 as the second tablet computer 100' may, following a user input, also perform the function as discussed above in conjunction with the first tablet computer 100.

Thus far, moving display of an object over the total display area of two tablet computers has been discussed, as well as resizing an object. Alternatively or additionally, display of a data object may be tilted. This is depicted in FIG. 6A and FIG. 6B. FIG. 6A shows a data object 600, of which a first object part 600' is displayed by the first tablet computer 100. A second object part 600" is displayed by the second tablet computer 100'. The two arrows indicate directions of gestures by fingers of a user. FIG. 6B shows the first tablet computer and the second tablet computer 100' showing an updated display of the data object 600 resulting from the user inputs received by the first tablet computer 100 and the second tablet computer 100'. In this embodiment, user inputs have been received by both tablet computers. In another embodiment, the user inputs may be received by only one of the two tablet computers.

Thus far, the data objects displayed by both touch screens of both tablet computers have been displayed as if the tablet computers calculating the subsets with data to be displayed and how the data is to be displayed were aware of the actual distance between the tablet computers. The tablet computers may not always be aware of this information. In such case, various object parts to be displayed may be displayed as if there was no distance at all between the tablet computers. This is depicted by FIG. 7. Alternatively, a default distance between the tablets or between the screens may be taken into account, for example one to three centimeters. This means that the way the data object 400 is displayed by both screens is not completely flush, but the first touch screen 102 and the second touch screen 102' nonetheless show the data object 400 as a contiguous object.

Figure 8:
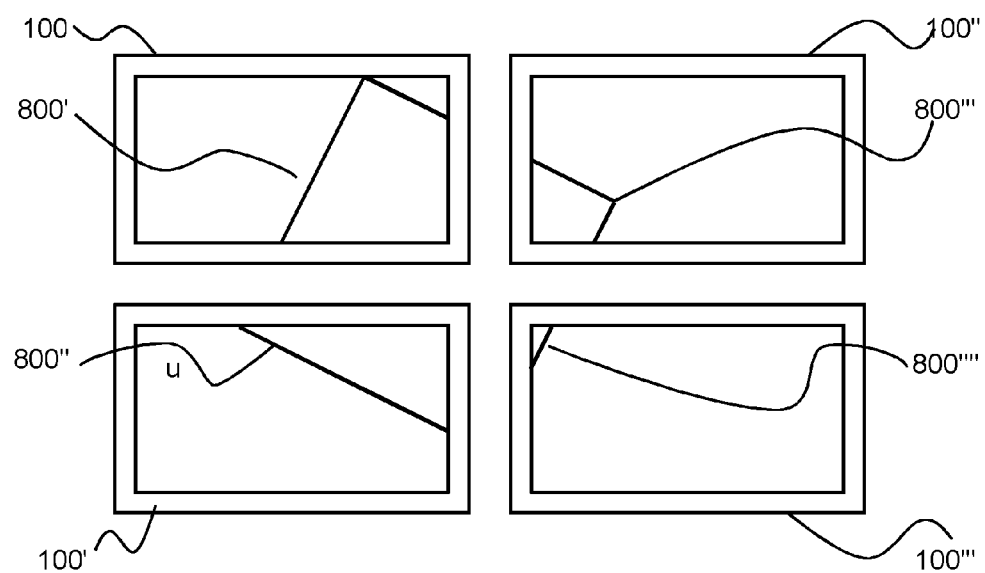
FIG. 8 shows the first tablet computer, the second tablet computer, a third tablet computer and a fourth tablet computer, together showing a data object on four screens of the four tablet computers.

The method described so far may also be employed by using more than two tablet computers. FIG. 8 shows display of a data object 800 by four tablet computers. A first tablet computer 100 shows a first data object part 800', a second tablet computer 100' shows a second data object part 800", a third tablet computer 100" shows a third data object part 800''' and a fourth tablet computer 100''' shows a fourth data object part 800''''. Also in this configuration, one tablet computer may act as master and the others as slave in a certain fixed setting. Alternatively, the functions of master and slave may rotate among the tablet computers, depending which tablet computer receives instructions for display of the data object or changing display of a data object displayed.

The embodiments shown thus far discuss the process discussed as being executed by tablet computers. Tablet computers usually comprise a screen as well as circuitry for processing data. Alternatively, the various processes discussed may also be executed on processing arrangements not comprising a screen. An example of such arrangement is a personal computer, as a tower or desktop model. The output of the processing performed by the personal computer is subsequently provided to a screen. The screen may be an actually active screen, like an LCD screen. Alternatively, the screen is a passive screen and the output is provided to a project apparatus as a display apparatus, popularly known as a beamer.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa. When data is being referred to as audiovisual data, it can represent audio only, video only or still pictures only or a combination thereof, unless specifically indicated otherwise in the description of the embodiments.

In the description above, it will be understood that when an element such as layer, region or substrate is referred to as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in FIG. 1, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

In summary, the various aspects relate to methods enabling display of a data object over two display apparatuses on the fly by operatively connecting two independent content processing devices together. Each device is arranged for rendering a subset of a dataset representing a data object When shown by display devices fed by each content processing devices, display of the subsets result in display of at least part of the data object in a contiguous way over the joint display area provided by the display devices. Furthermore, it enables interactive control of the way the data object is displayed over a display area provided by the first display apparatus controlled by the first content processing device and the second display apparatus controlled by the second content processing device. The method may be extended to more than two screens. The devices may operate in a master-slave configuration or in a peer-to-peer configuration, with or without a central server.

The invention claimed is:

1. In a first content processing device for processing content for display by a first display apparatus, a method of processing at least a part of a content item, comprising:
   obtaining at least a first subset of a dataset representing the content item;
   rendering data comprised by the first subset for display by the first display apparatus;
   receiving a user input command for changing display of at least part of the content item by the first display apparatus;
   determining a second subset of the dataset, the second subset comprising data to be rendered for display by the first display apparatus in accordance with the user input command;
   rendering data comprised by the second subset for display by the first display apparatus;
   communicating, to a second content processing device, data enabling the second content processing device to render a third subset of the dataset for display by a second display apparatus, the communicated data comprising at least one of:
      i) data indicating where the data comprised by the third subset is to be displayed by the second display apparatus; and
      ii) data indicating how the data of the second subset is to be displayed by the first display apparatus;
   the communicated data enabling the second content processing device to render the data in the third subset such that display by the second display apparatus of the rendered data of the third subset results in displaying at least part of the content item by the first display apparatus and the second display apparatus in a substantially contiguous way in accordance with the user input command.

2. The method according to claim 1, further comprising:
   determining position data indicating a first position of the first display apparatus relative to a second position of the second display apparatus; and
   based on the position data being determined, determining the third subset;
   wherein communicating data enabling the second content processing device to render the third subset of the dataset for display by the second display apparatus comprises communicating the third subset.

3. The method according to claim 2, wherein determining the position data comprises receiving user input indicating the first position of the first display apparatus relative to the second position of the second display apparatus.

4. The method according to claim 1, wherein position data comprises at least one of the following indications:
   the second display apparatus is provided left of the first display apparatus;
   the second display apparatus is provided right of the first display apparatus;
   the second display apparatus is provided above the first display apparatus; or
   the second display apparatus is provided below the first display apparatus.

5. The method according to claim 1, wherein communicating data enabling the second content processing device to render the third subset of the dataset for display by the second display apparatus comprises communicating data on the second subset.

6. In a second content processing device for processing content, related to a content object and represented by a dataset, for display by a second display apparatus, a method of processing at least part of a content item, comprising;
   receiving, from a first content processing device for processing content for display by a first display apparatus provided in the vicinity of the second display apparatus, data enabling the second content processing device to render a third subset of the dataset for display by the second display apparatus, the data received comprising at least one of:
      i) data indicating where the data comprised by the third subset is to be displayed by the second display apparatus; and
      ii) data indicating how the data of a second subset is to be displayed by the first display apparatus;
   the received data enabling the second content processing device to obtain the data in the third subset such that display by the second display apparatus of rendered data of the third subset results in displaying at least part of the content item in a substantially contiguous way over the first display apparatus and the second display apparatus;
   obtaining the third subset based on the data received; and
   rendering data comprised by the third subset for display by the second display apparatus.

7. The method according to claim 6, wherein the third subset is received from the first content processing device.

8. The method according to claim 6,
   wherein the data received from the first content processing device comprises data related to a first subset of the dataset, the first subset comprising data rendered by the first content processing device for display by the first display apparatus,
   the method further comprising:
   obtaining the dataset;
   determining position data of a position of the first display apparatus relative to the second display apparatus; and
   based on the position data and the data related to the first subset, determining the third subset.

9. The method according to claim 6,
   wherein the data received from the first content processing device comprises position data being determined of a position of the first display apparatus relative to the second display apparatus and data related to a first subset of the dataset, the first subset comprising data rendered by the first content processing device for display by the first display apparatus; and
   the method further comprising, based on the position data and the data related to the first subset, determining the third subset.

10. An arrangement for processing content for display by a first display apparatus, the arrangement comprising:
   a rendering module for rendering data for displaying the data by the first display apparatus, the rendering module being arranged to obtain at least a first subset of a dataset representing a content item and to render data comprised by the first subset for display by the first display apparatus;

a user input module for receiving a user input command for changing display of at least part of the content item by the first display apparatus;

a processing unit arranged to determine a second subset of the dataset, the second subset comprising data to be rendered for display by the first display apparatus in accordance with the user input command; and a communication module arranged to communicate, to a second content processing device, data enabling the second content processing device to render a third subset of the dataset for display by a second display apparatus, the communicated data comprising at least one of:

i) data indicating where the data comprised by the third subset is to be displayed by the second display apparatus; and ii) data indicating how the data of the second subset is to be displayed by the first display apparatus;

the communicated data enabling the second processing device to render the data in the third subset such that display by the second display apparatus of the rendered data of the third subset results in displaying at least part of the content item by the first display apparatus and the second display apparatus in a substantially contiguous way in accordance with the user input command;

wherein the rendering module is arranged to render data comprised by the second subset for display of the data of the second subset by the first display apparatus.

11. A system for processing and displaying of a content item, the system comprising:
the arrangement according to claim 10; and
a touchscreen arranged to:
display of data rendered by the rendering module;
receive a user input command for changing display of at least part of the content item by the first display apparatus; and
forward the user input command to the user input module.

12. An arrangement for processing content, related to a content object and represented by a dataset, for display by a second display apparatus, the arrangement comprising:
a communication module arranged to receive, from a first content processing device for processing content for display by a first display apparatus provided in the vicinity of the second display apparatus, data comprising at least one of:
i) data indicating where the data comprised by a third subset is to be displayed by the second display apparatus; and
ii) data indicating how the data of a second subset is to be displayed by the first display apparatus;
the received data enabling a second content processing device to render the third subset of the dataset for display by the second display apparatus, the data received enabling the second content processing device to render the data in the third subset such that display by the second display apparatus of the rendered data of the third subset results in displaying at least part of the content item in a substantially contiguous way over the first display apparatus and the second display apparatus; and
a rendering module for rendering data for displaying the data by the second display apparatus, the rendering module being arranged to obtain at least the second subset of the dataset and to render data comprised by the second subset for display by the second display apparatus.

13. A non-transitory computer-readable medium storing a computer program arranged to carry out the method of claim 1.

14. A non-transitory computer-readable medium storing a computer program arranged to carry out the method of claim 6.

15. The method according to claim 1, further comprising determining position data indicating a first position of the first display apparatus relative to a second position of the second display apparatus and wherein communicating data enabling the second content processing device to render the third subset of the dataset for display by the second display apparatus comprises communicating the position data being determined.

16. The method according to claim 15, wherein the position data is a default distance between the first display apparatus and the second display apparatus.

17. A method of processing at least a part of a content item, comprising:
obtaining, via a first content processing device, at least a first subset of a dataset representing the content item;
rendering data comprised by the first subset for display by a first display apparatus of the first content processing device;
receiving, via a first user input module of the first content processing device, a first user input command for changing display of at least part of the content item by the first display apparatus;
receiving, via a second user input module of a second content processing device, a second user input command for changing display of at least part of the content item by the first display apparatus;
determining a second subset of the dataset, the second subset comprising data to be rendered for display by the first display apparatus in accordance with the first user input command and the second user input command;
rendering data comprised by the second subset for display by the first display apparatus;
communicating, to the second content processing device, data enabling the second content processing device to render a third subset of the dataset for display by a second display apparatus of the second content processing device, the communicated data comprising at least one of:
i) data indicating where the data comprised by the third subset is to be displayed by the second display apparatus; and
ii) data indicating how the data of the second subset is to be displayed by the first display apparatus;
the communicated data enabling the second content processing device to render the data in the third subset such that display by the second display apparatus of the rendered data of the third subset results in displaying at least part of the content item by the first display apparatus and the second display apparatus in a substantially contiguous way in accordance with the first user input command and the second user input command.

18. The method according to claim 17, wherein:
the first user input command is received by the first user input module from a first touch screen of the first content processing device; and the second user input command is received by the second user input module from a second touch screen of the second content processing device.

\* \* \* \* \*